(12) United States Patent
Terashima

(10) Patent No.: US 10,738,840 B2
(45) Date of Patent: Aug. 11, 2020

(54) CONTROL DEVICE AND CONTROL METHOD FOR DUAL CLUTCH TRANSMISSION

(71) Applicant: ISUZU MOTORS LIMITED, Shinagawa-ku, Tokyo (JP)

(72) Inventor: Koji Terashima, Fujisawa (JP)

(73) Assignee: ISUZU MOTORS LIMITED, Shinagawa-Ku, Tokyo (JP)

(*) Notice: Subject to any disclaimer, the term of this patent is extended or adjusted under 35 U.S.C. 154(b) by 159 days.

(21) Appl. No.: 16/081,889

(22) PCT Filed: Feb. 23, 2017

(86) PCT No.: PCT/JP2017/006796
§ 371 (c)(1),
(2) Date: Aug. 31, 2018

(87) PCT Pub. No.: WO2017/150326
PCT Pub. Date: Sep. 8, 2017

(65) Prior Publication Data
US 2019/0078625 A1    Mar. 14, 2019

(30) Foreign Application Priority Data
Mar. 1, 2016    (JP) .................................. 2016-038791

(51) Int. Cl.
*F16D 25/10* (2006.01)
*F16H 61/12* (2010.01)
(Continued)

(52) U.S. Cl.
CPC ........... *F16D 25/10* (2013.01); *F16D 25/063* (2013.01); *F16D 48/02* (2013.01); *F16D 48/06* (2013.01);
(Continued)

(58) Field of Classification Search
None
See application file for complete search history.

(56) References Cited

U.S. PATENT DOCUMENTS

| 6,523,657 B1 * | 2/2003 | Kundermann .......... F16D 21/06 192/107 M |
| 2008/0236983 A1 * | 10/2008 | Kummer ................. F16D 21/06 192/48.611 |

(Continued)

FOREIGN PATENT DOCUMENTS

| CN | 102200187 A | 9/2011 |
| CN | 102345732 A | 2/2012 |

(Continued)

OTHER PUBLICATIONS

First Office Action for related CN App No. 201780014446.1 dated Jul. 29, 2019, 18 pgs.

(Continued)

*Primary Examiner* — Colby M Hansen
(74) *Attorney, Agent, or Firm* — Procopio, Cory, Hargreaves & Savitch LLP

(57) ABSTRACT

The present disclosure includes: a creep control unit configured to perform a creep control including bringing one of a first clutch and a second clutch into a half-clutch state and bringing the other into a disengaged state, so as to transmit a predetermined torque from a drive source to a transmission mechanism via a clutch device; and a clutch switching control unit configured to, when a vehicle stops during the performing of the creep control, perform a clutch switching control including, on the basis of the heat-generating state of the one clutch that is maintained in the half-clutch state from the stop of the vehicle, switching the one clutch from the half-clutch state to the disengaged state and switching the other clutch from the disengaged state to the half-clutch state.

11 Claims, 4 Drawing Sheets

(51) Int. Cl.
   *F16D 48/06* (2006.01)
   *F16D 48/02* (2006.01)
   *F16D 25/06* (2006.01)
   *F16H 61/688* (2006.01)
   *F16D 25/063* (2006.01)
   *F16D 21/06* (2006.01)

(52) U.S. Cl.
   CPC .......... *F16H 61/12* (2013.01); *F16H 61/688* (2013.01); *F16D 2021/0661* (2013.01); *F16D 2500/1045* (2013.01); *F16D 2500/10412* (2013.01); *F16D 2500/30404* (2013.01); *F16D 2500/30405* (2013.01); *F16D 2500/3111* (2013.01); *F16D 2500/50215* (2013.01); *F16D 2500/50296* (2013.01); *F16D 2500/5102* (2013.01); *F16D 2500/5106* (2013.01)

(56) References Cited

U.S. PATENT DOCUMENTS

| | | | |
|---|---|---|---|
| 2010/0243395 | A1* | 9/2010 | Wiesneth ............... F16D 21/06 192/48.1 |
| 2011/0238276 | A1 | 9/2011 | Tsujimura et al. |
| 2012/0028759 | A1 | 2/2012 | Tsujimura et al. |
| 2012/0247903 | A1* | 10/2012 | Pritchard ............... F16D 21/06 192/48.1 |
| 2013/0282246 | A1 | 10/2013 | Burtch |
| 2014/0149009 | A1 | 5/2014 | Terashima |

FOREIGN PATENT DOCUMENTS

| | | |
|---|---|---|
| CN | 103640570 A | 3/2014 |
| DE | 102006051481 A1 | 5/2007 |
| EP | 1357309 A2 | 10/2003 |
| EP | 1628030 A2 | 2/2006 |
| EP | 2730814 A1 | 5/2014 |
| JP | 2006-292055 A | 10/2006 |
| JP | 2007-118862 | 5/2007 |
| JP | 2009-127791 A | 6/2009 |
| JP | 2011-256984 A | 12/2011 |
| JP | 2013-015185 A | 1/2013 |

OTHER PUBLICATIONS

Extended European Search Report for related EP Application No. 17806737.7, dated Mar. 26, 2019 (7 pages).
International Search Report and Written Opinion for related International Application No. PCT/JP2017/006796 dated May 23, 2017; English translation of ISR provided; 11 pages.
Notice of Reasons for Refusal for related JP App No. 2016-038791, dated Nov. 5, 2019, 10 pages.

* cited by examiner

CONTROL DEVICE AND CONTROL METHOD FOR DUAL CLUTCH TRANSMISSION

CROSS-REFERENCE TO RELATED APPLICATIONS

This application is a U.S. National Stage entry of PCT Application No: PCT/JP2017/006796 filed on Feb. 23, 2017, which claims priority to Japanese Patent Application No. 2016-038791, filed Mar. 1, 2016, the contents of which are incorporated herein by reference.

TECHNICAL FIELD

The present disclosure relates to a control device and control method for a dual clutch transmission.

BACKGROUND ART

A dual clutch transmission in which a dual clutch device including two clutches is provided between an engine and a transmission mechanism, and a power transmission path from the engine to a vehicle drive system via the transmission mechanism is set into two lines, has been put into practical use.

In such a dual clutch transmission, during vehicle creeping, a creep control including bringing one of the clutches bringing into a half-engaged state (half-clutch state) so as to slightly transmit a torque to the vehicle drive system is performed (for example, see Patent Document 1).

PRIOR ART DOCUMENT

Patent Document

Patent Document 1: JP-A-2011-256984

SUMMARY OF THE INVENTION

Problems to be Solved by the Invention

When the vehicle stops due to foot brake operation of a driver during the creep control, the clutch that is controlled to the half-clutch state increases a rotation speed difference between an input side and an output side as the vehicle drive system stops rotating, so that an amount of slip of the clutch plate is also increased. Therefore, when the vehicle stops for a predetermined time or longer, a clutch friction surface may be overheated, and function loss and durability of the clutch may be deteriorated.

An object of the technique of the present disclosure is to effectively suppress the deterioration in function loss and durability of the clutch.

Means for Solving the Problems

A control device of the present disclosure is a control device for a dual clutch transmission that is provided with a clutch device including a first clutch and a second clutch between a drive source and a transmission mechanism and is configured to switch a torque transmission path from the transmission mechanism to a vehicle drive system into two lines, and the control device includes: a first control means configured to perform a creep control including bringing one of the first clutch and the second clutch into a half-clutch state and bringing the other of the first clutch and the second clutch into a disengaged state, so as to transmit a prescribed torque from the drive source to the transmission mechanism via the clutch device; and a second control means configured to, when a vehicle stops during the performing of the creep control, perform a clutch switching control including, on the basis of a heat-generating state of the one clutch that is maintained in the half-clutch state from the stop of the vehicle, switching the one clutch from the half-clutch state to the disengaged state and switching the other clutch from the disengaged state to the half-clutch state.

The control device for a dual clutch transmission may further include a first temperature detection means that detects a temperature of the first clutch; and a second temperature detection means that detects a temperature of the second clutch; wherein when the vehicle stops during the performing of the creep control, the second control means performs the clutch switching control when a temperature of the one clutch that is maintained in the half-clutch state reaches a predetermined threshold, the temperature of the one clutch being detected by the first or second temperature detection means from the stop of the vehicle.

When the vehicle stops during the performing of the creep control, the second control means may perform the clutch switching control when a half-clutch duration time of the one clutch that is maintained in the half-clutch state reaches a predetermined threshold from the stop of the vehicle.

When the vehicle stops during the performing of the creep control, the second control means may perform the clutch switching control when absorbed energy of the one clutch that is maintained in the half-clutch state reaches a predetermined threshold from the stop of the vehicle.

The control device for a dual clutch transmission may further include a third control means configured to perform a transmission torque control in which a half-clutch engagement rate of the other clutch that is switched to the half-clutch state by the clutch switching control is adjusted so as to set the transmission torque from the drive source to the vehicle drive system to be constant before and after the clutch switching control.

A control method of the present disclosure is a control method for a dual clutch transmission that is provided with a clutch device including a first clutch and a second clutch between a drive source and a transmission mechanism and is configured to switch a torque transmission path from the transmission mechanism to a vehicle drive system into two lines, and the control method includes: performing a clutch switching control including, when a vehicle stops during performing of a creep control including bringing one of the first clutch and the second clutch into a half-clutch state and bringing the other of the first clutch and the second clutch into a disengaged state so as to transmit a prescribed torque from the drive source to the transmission mechanism via the clutch device, on the basis of a heat-generating state of the one clutch that is maintained in the half-clutch state from the stop of the vehicle, switching the one clutch from the half-clutch state to the disengaged state and switching the other clutch from the disengaged state to the half-clutch state.

When the vehicle stops during the performing of the creep control, the clutch switching control may be performed when a temperature of the one clutch that is maintained in the half-clutch state reaches a predetermined threshold from the stop of the vehicle.

When the vehicle stops during the performing of the creep control, the clutch switching control may be performed when a half-clutch duration time of the one clutch that is maintained in the half-clutch state reaches a predetermined threshold from the stop of the vehicle.

When the vehicle stops during the performing of the creep control, the clutch switching control may be performed when absorbed energy of the one clutch that is maintained in the half-clutch state reaches a predetermined threshold from the stop of the vehicle.

A transmission torque control in which a half-clutch engagement rate of the other clutch that is switched to the half-clutch state by the clutch switching control is adjusted so as to set the transmission torque from the drive source to the vehicle drive system to be constant before and after the clutch switching control, may be performed.

A control device according to another aspect of the present disclosure is a control device for a dual clutch transmission that is provided with a clutch device including a first clutch and a second clutch between a drive source and a transmission mechanism and is configured to switch a torque transmission path from the transmission mechanism to a vehicle drive system into two lines, and the control device includes: a first control means configured to perform a creep control including bringing the first clutch into a half-clutch state and bringing the second clutch into a disengaged state, so as to transmit a prescribed torque from the drive source to the transmission mechanism via the clutch device; and a second control means configured to, when the vehicle stops during the performing of the creep control, perform a clutch switching control including, on the basis of a heat-generating state of the first clutch that is maintained in the half-clutch state from the stop of the vehicle, switching the first clutch from the half-clutch state to the disengaged state and switching the second clutch from the disengaged state to the half-clutch state.

A control method according to another aspect of the present disclosure is a control method for a dual clutch transmission that is provided with a clutch device including a first clutch and a second clutch between a drive source and a transmission mechanism and is configured to switch a torque transmission path from the transmission mechanism to a vehicle drive system into two lines, and the control method includes: performing a clutch switching control including, when a vehicle stops during performing of a creep control including bringing the first clutch into a half-clutch state and bringing the second clutch into a disengaged state, so as to transmit a predetermined torque from the drive source to the transmission mechanism via the clutch device, on the basis of a heat-generating state of the first clutch that is maintained in the half-clutch state from the stop of the vehicle, switching the first clutch from the half-clutch state to the disengaged state and switching the second clutch from the disengaged state to the half-clutch state.

Effect of the Invention

According to the technique of the present disclosure, deterioration in function loss and durability of the clutch can be suppressed effectively.

DESCRIPTION OF EMBODIMENTS

Figure 1:
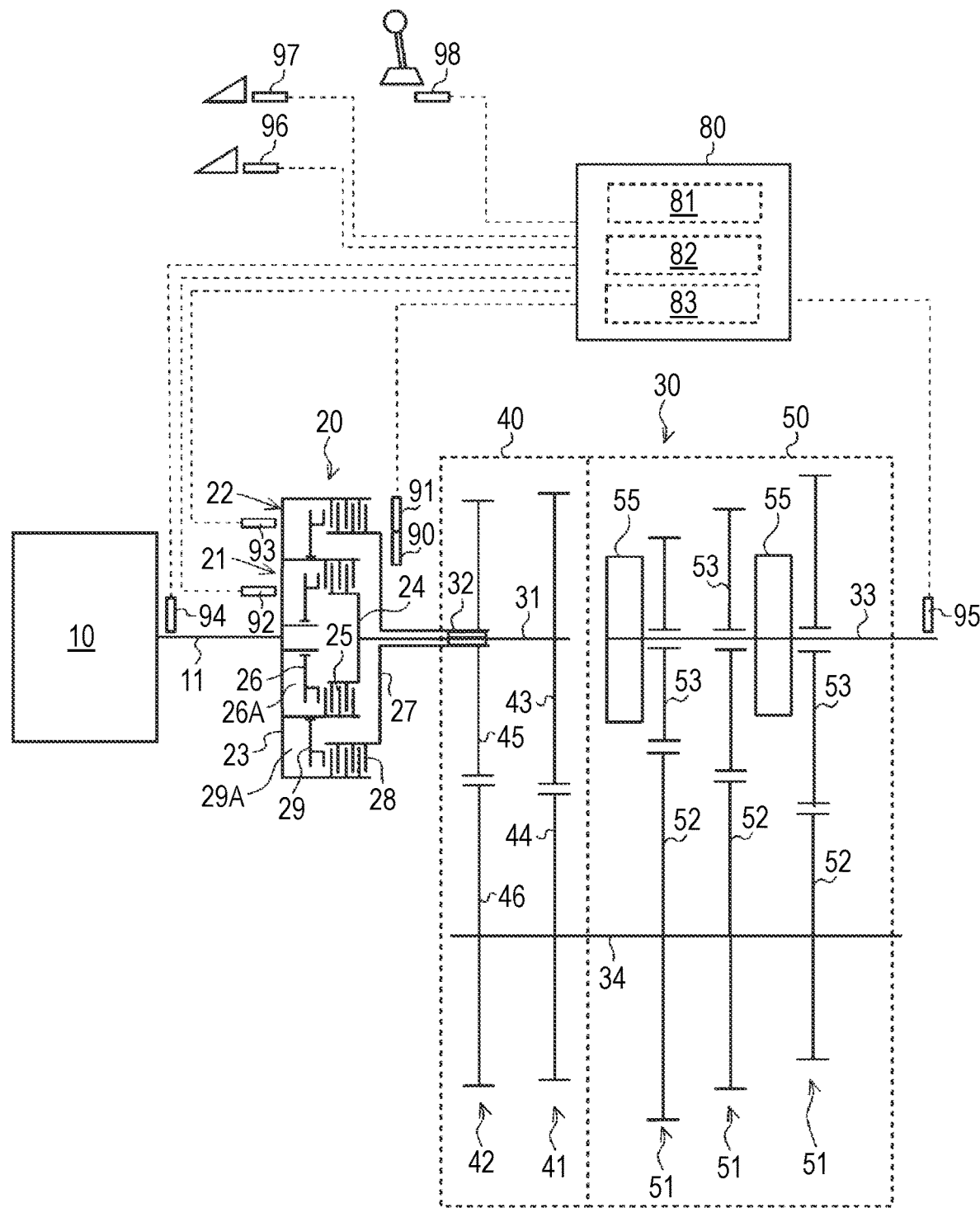
FIG. 1 is an overall schematic configuration diagram showing a dual clutch transmission according to a first embodiment of the present disclosure.

Hereinafter, a control device and control method for a dual clutch transmission according to embodiments of the preset disclosure will be described with reference to the accompanying drawings. The same components are denoted by the same reference numerals, and names and functions of these components are also the same. Therefore, detailed descriptions of the same components are not repeated.

First Embodiment

FIG. 1 is an overall schematic configuration diagram showing a dual clutch transmission according to a first embodiment. In FIG. 1, reference numeral 10 denotes an engine that is a drive source, reference numeral 80 denotes a control unit, reference numeral 90 denotes a first temperature sensor, reference numeral 91 denotes a second temperature sensor, reference numeral 92 denotes a first hydraulic pressure sensor, reference numeral 93 denotes second hydraulic pressure sensor, reference numeral 94 denotes an engine rotation speed sensor, reference numeral 95 denotes a vehicle speed sensor (also referred to as an output rotation speed sensor), reference numeral 96 denotes a brake pedal sensor, reference numeral 97 denotes an accelerator opening sensor, and reference numeral 98 denotes a shift position sensor, respectively.

The dual clutch transmission includes a dual clutch device 20 including a first clutch 21 and a second clutch 22, and a transmission mechanism 30.

The first clutch 21 is, for example, a wet multi-plate clutch, and includes a clutch hub 23 that rotates integrally with an output shaft 11 of the engine 10, a first clutch drum 24 that rotates integrally with a first input shaft 31 of the transmission mechanism 30, a plurality of first clutch plates 25, a first piston 26 that is in pressure contact with the first clutch plates 25, and a first hydraulic chamber 26A.

When the first piston 26 performs a stroke movement toward an output side (right side in FIG. 1) due to hydraulic oil pressure supplied to the first hydraulic chamber 26A, the first clutch plates 25 are pressed and the first clutch 21 is brought into an engaged state for transmitting a torque. When the hydraulic oil pressure in the first hydraulic chamber 26A is released, the first piston 26 performs a stroke movement toward an input side (left side in FIG. 1) under an urging force of a spring (not shown), and the first clutch 21 is brought into a disengaged state for cutting off power transmission. In the description below, a state in which a torque is transmitted via the first clutch plates 25 while the clutch hub 23 and the first clutch drum 24 rotate at different rotation speeds is referred to as a half-clutch state of the first clutch 21.

The second clutch 22 is, for example, a wet multi-plate clutch, and includes a clutch hub 23, a second clutch drum 27 that rotates integrally with a second input shaft 32 of the transmission mechanism 30, a plurality of second clutch plates 28, a second piston 29 that is in pressure contact with the second clutch plates 28, and a second hydraulic chamber 29A.

When the second piston 29 performs a stroke movement toward the output side (right side in FIG. 1) due to hydraulic oil pressure supplied to the second hydraulic chamber 29A, the second clutch plates 28 are pressed and the second clutch 22 is brought into an engaged state for transmitting torque.

When the hydraulic oil pressure is released, the second piston 29 performs a stroke movement toward the input side (left side in FIG. 1) under an urging force of a spring (not shown), and the second clutch 22 is brought into a disengaged state for cutting off power transmission. In the description below, a state in which a torque is transmitted via the second clutch plates 28 while the clutch hub 23 and the second clutch drum 27 rotate at different rotation speeds is referred to as a half-clutch state of the second clutch 22.

The transmission mechanism 30 includes an auxiliary transmission part 40 disposed on the input side thereof and a main transmission part 50 disposed on the output side thereof. Further, the transmission mechanism 30 includes the first input shaft 31 and the second input shaft 32 provided on the auxiliary transmission part 40, an output shaft 33 provided on the main transmission part 50, and an auxiliary shaft 34 disposed in parallel to the shafts 31 to 33. The first input shaft 31 is relatively rotatably inserted in a hollow shaft passing through the second input shaft 32 in an axial direction thereof. A propeller shaft that is coupled to a vehicle drive wheel via a differential device or the like (not shown), is connected to an output end of the output shaft 33.

The auxiliary transmission part 40 is provided with a first splitter gear pair 41 and a second splitter gear pair 42. The first splitter gear pair 41 includes a first main input gear 43 fixed to the first input shaft 31, and a first auxiliary input gear 44 fixed to the auxiliary shaft 34 and constantly meshed with the first main input gear 43. The second splitter gear pair 42 includes a second main input gear 45 fixed to the second input shaft 32, and a second auxiliary input gear 46 fixed to the auxiliary shaft 34 and constantly meshed with the second main input gear 45.

The main transmission part 50 is provided with a plurality of output gear pairs 51 and a plurality of synchronization mechanisms 55. The output gear pair 51 includes an auxiliary output gear 52 fixed to the auxiliary shaft 34, and a main output gear 53 that is provided relatively rotatably on the output shaft 33 and constantly meshed with the auxiliary output gear 52. The synchronization mechanism 55 has a known structure and includes a dog clutch, or the like (not shown). Operation of the synchronization mechanism 55 is controlled by the control unit 80, and the output shaft 33 and main output gears 53 are switched selectively to an engaged state (gear connecting) or a disengaged state (neutral state) according to a current shift position detected by the shift position sensor 98. The number, arrangement pattern, or the like of the output gear pairs 51 and the synchronization mechanisms 55 are not limited to the illustrated example, and can be appropriately changed without departing from the spirit of the present disclosure.

The control unit 80 performs various controls on the engine 10, the dual clutch device 20, the transmission mechanism 30, or the like, and includes a known CPU, a ROM, a RAM, an input port, an output port, or the like. In order to perform the various controls, sensor values of various sensors such as the first temperature sensor 90, the second temperature sensor 91, the first hydraulic pressure sensor 92, the second hydraulic pressure sensor 93, the engine rotation speed sensor 94, the vehicle speed sensor 95, the brake pedal sensor 96, the accelerator opening sensor 97, and the shift position sensor 98 are input to the control unit 80.

Further, the control unit 80 includes a creep control unit 81, a clutch switching control unit 82, and a transmission torque control unit 83 as a part of functional elements. Although these functional elements are integrally included in the control unit 80 that is hardware in the present embodiment, a part of the functional elements can also be provided in separate hardware.

The creep control unit 81 is a first control means of the present disclosure, and, during the vehicle creep, performs a creep control including bringing one of the first clutch 21 and the second clutch 22 into a half-clutch state, bringing the other into a disengaged state, and gear connecting the main transmission part 50 to a predetermined gear position so as to transmit a predetermined torque from the drive source 10 to the transmission mechanism 30. Since the creep control is generally a well-known technique, a detailed description thereof will be omitted.

The clutch switching control unit 82 is a second control means of the present disclosure, and in a case where the vehicle stops due to foot brake operation of a driver or the like during performing of the creep control, the clutch switching control unit 82 performs a clutch switching control including switching one of the clutches 21, 22 that is in a half-clutch state into the disengaged state and switching the other of the clutches 21, 22 into the half-clutch state when a temperature (temperature of a clutch friction surface) $T_{CL}$ of one of the clutches 21, 22 that is controlled to a half-clutch state reaches a predetermined threshold temperature $T_{MAX}$ that may cause function loss due to overheating.

More specifically, in a case where the vehicle stops in a state where a creep control in which the first clutch 21 is set to the half-clutch state and the second clutch 22 is set to the disengaged state is performed, a clutch switching control including switching the first clutch 21 to the disengaged state and switching the second clutch 22 to the half-clutch state is performed when a temperature $T_{CL\_1}$ of the first clutch 21 reaches a first threshold temperature $T_{MAX\_1}$ from the stop of the vehicle. Similarly, in a case where the vehicle stops in a state where a creep control in which the second clutch 22 is set to the half-clutch state and the first clutch 21 is set to the disengaged state is performed, a clutch switching control including switching the second clutch 22 to the disengaged state and switching the first clutch 21 to the half-clutch state when a temperature $T_{CL\_2}$ of the second clutch 22 reaches a second threshold temperature $T_{MAX\_2}$ from the stop of the vehicle.

The first threshold temperature $T_{MAX\_1}$ and the second threshold temperature $T_{MAX\_2}$ may be set to the same value, or the second threshold temperature $T_{MAX\_2}$ of the second clutch 22 on an outer side with a large clutch capacity may be set higher than the first threshold temperature $T_{MAX\_1}$. Further, whether the vehicle stops may be determined based on a sensor value of the brake pedal sensor 96 or the vehicle speed sensor 95. Further, the temperature $T_{CL\_1}$ of the first clutch 21 and the temperature $T_{CL\_2}$ of the second clutch 22 may be detected by the first temperature sensor 90 and the second temperature sensor 91 respectively.

Thus, when the vehicle stops during a creep control in which a large load is applied on clutch friction surfaces of the clutch plates 25, 28, the clutches 21, 22 are alternately switched to the half-clutch state according to an overheated state of the clutch plates 25, 28, so that deterioration in function loss and durability of the clutches 21, 22 can be effectively prevented.

The transmission torque control unit 83 is a third control means of the present disclosure, and performs a transmission torque control in which a half-clutch engagement rate of the clutches 21, 22 after switching is adjusted so as to set a torque that is transmitted to the vehicle drive system to be constant (unchanged) before and after switching of the clutches 21, 22 by the clutch switching control unit 82. More specifically, a storage unit (not shown) in the control unit 80 stores an hydraulic pressure and transmission torque map (not shown) that is created in advance and defines a relationship between hydraulic oil pressures of the hydraulic chambers 26A, 29A and the transmission torque from the dual clutch device 20 to the transmission mechanism 30. The transmission torque control unit 83 performs a feedback control on the half-clutch engagement rate of the clutches 21, 22 after switching so as to set the transmission torque to the vehicle drive system to be constant before and after the clutch switching on the basis of the hydraulic pressure and transmission torque map and sensor values of the hydraulic pressure sensors 92, 93, the vehicle speed sensor (output rotation speed sensor) 95, or the like.

Figure 2:
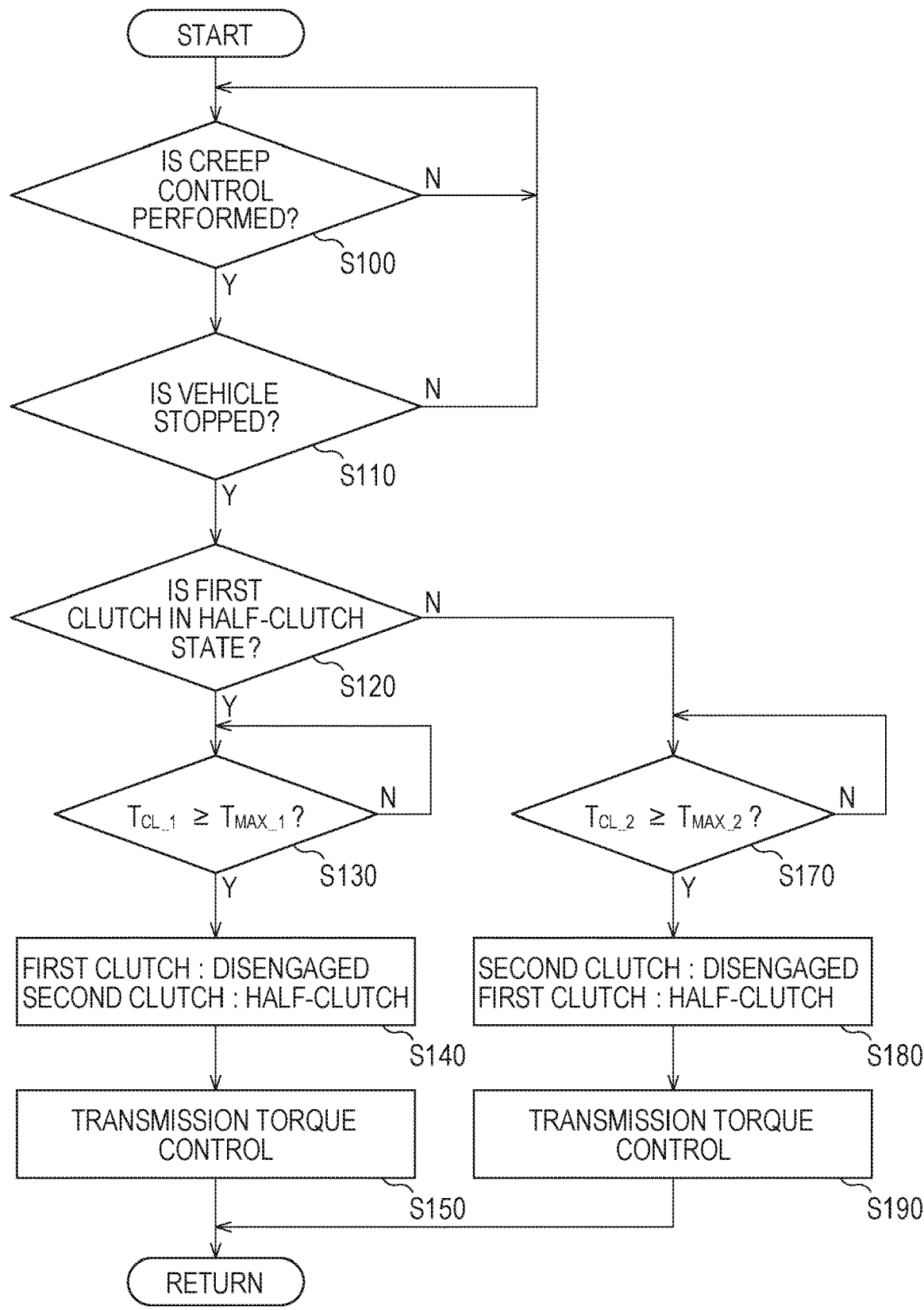
FIG. 2 is a flowchart illustrating a clutch switching control according to the first embodiment of the present disclosure.

Next, a flow of the clutch switching control according to the first embodiment will be described based on FIG. 2.

In step S100, it is determined whether a creep control bringing one of the first clutch 21 and the second clutch 22 into to the half-clutch state is performed. If YES, the process proceeds to step S110.

In step S110, it is determined whether a driver performs foot brake operation and the vehicle stops during the creep control. If the brake pedal sensor 96 is ON and the vehicle speed sensor 95 detects 0 (YES), the process proceeds to step S120.

In step S120, it is determined whether the clutch controlled to the half-clutch state is the first clutch 21. If YES, that is, if the first clutch 21 is controlled to the half-clutch state, the process proceeds to step S130. If NO, that is, if the second clutch 22 is controlled to the half-clutch state, the process proceeds to step S170.

In step S130, it is determined whether the temperature $T_{CL\_1}$ of the first clutch 21 detected by the first temperature sensor 90 reaches the first threshold temperature $T_{MAX\_1}$. If YES, the process proceeds to step S140 to prevent the function loss of the first clutch 21, and a clutch switching control switching the first clutch 21 to the disengaged state and switching the second clutch 22 to the half-clutch state is performed.

Further, in step S150, a transmission torque control in which the half-clutch engagement rate of the second clutch is adjusted is performed so as to set the transmission torque to be constant before and after the switching from the first clutch 21 to the second clutch 22, and then the control is returned.

In step S120, if NO, that is, if the second clutch 22 is in the half-clutch state, the process proceeds to step S170, and it is determined whether the temperature $T_{CL\_2}$ of the second clutch 22 detected by the second temperature sensor 91 reaches the second threshold temperature $T_{MAX\_2}$. If YES, the process proceeds to step S180 to prevent the function loss of the second clutch 22, and a clutch switching control switching the second clutch 22 to the disengaged state and switching the first clutch 21 to the half-clutch state is performed.

Further, in step S190, a transmission torque control in which the half-clutch engagement rate of the first clutch is adjusted is performed so as to set the transmission torque to be constant before and after the switching from the second clutch 22 to the first clutch 21, and then the control is returned.

As described above in detail, according to the first embodiment, in a case where the vehicle stops during the creep control, the clutch switching control is performed such that one of the clutches 21, 22 that is in the half-clutch state is switched to the disengaged state and the other of the clutches 21, 22 is switched to the half-clutch state when a temperature $T_{CL}$ of one of the clutches 21, 22 that is switched to the half-clutch state reaches the threshold temperature $T_{MAX}$. Thus, when the vehicle stops during a creep control in which a large load is applied on clutch friction surfaces of the clutch plates 25, 28, the clutches 21, 22 are alternately switched to the half-clutch state according to an overheated state of the clutch plates 25, 28, so that the deterioration in function loss and durability of the clutches 21, 22 can be effectively prevented.

Further, according to the first embodiment, the transmission torque control is performed such that the half-clutch engagement rate of the clutches 21, 22 after switching is adjusted so as to set the torque transmitted to the vehicle drive system to be constant before and after the clutch switching control. Therefore, vibration or unintended start of the vehicle due to torque fluctuation after the clutch is switched can be effectively prevented.

Second Embodiment

Figure 3:
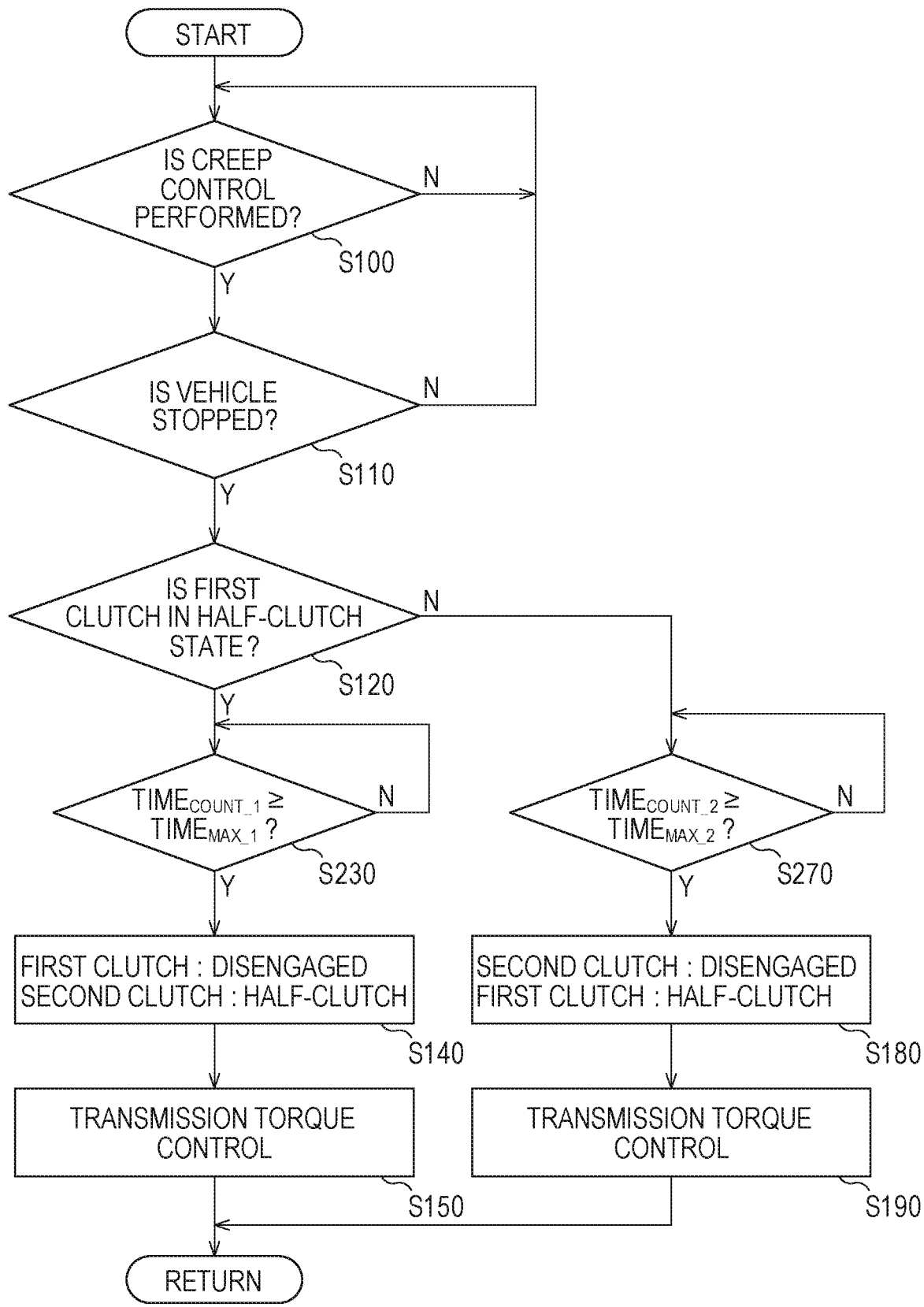
FIG. 3 is a flowchart illustrating a clutch switching control according to a second embodiment of the present disclosure.

Hereinafter, a control device and control method for a dual clutch transmission according to a second embodiment will be described based on FIG. 3. The second embodiment is configured such that the clutch switching control unit 82 performs a clutch switching control based on a duration time $TIME_{COUNT}$ of the half-clutch states of the clutches 21, 22. The same steps as the processes of the first embodiment are denoted by the same reference numerals, and detailed description thereof will be omitted.

In step S230, it is determined whether a half-clutch duration time $TIME_{COUNT\_1}$ of the first clutch 21 that is counted from the stop of the vehicle by a timer (not shown) incorporated in the control unit 80 reaches a predetermined first threshold time $TIME_{MAX\_1}$ that may cause function loss of the first clutch 21. If YES, the process proceeds to step S140 to prevent the function loss of the first clutch 21, and a clutch switching control switching the first clutch 21 to the disengaged state and switching the second clutch 22 to the half-clutch state is performed.

In step S120, if NO, that is, if the second clutch 22 is in the half-clutch state, the process proceeds to step S270, and it is determined whether a half-clutch duration time $TIME_{COUNT\_2}$ of the second clutch 22 that is counted from the stop of the vehicle by the timer (not shown) reaches a predetermined second threshold time $TIME_{MAX\_2}$ that may cause function loss of the second clutch 22. If YES, the process proceeds to step S180 to prevent the function loss of the second clutch 22, and a clutch switching control switching the second clutch 22 to the disengaged state and switching the first clutch 21 to the half-clutch state is performed.

As described above in detail, according to the second embodiment, in a case where the vehicle stops during the creep control, the clutch switching control is performed such that one of the clutches 21, 22 that is in the half-clutch state is controlled to the disengaged state and the other of the clutches 21, 22 is controlled to the half-clutch state when the half-clutch duration time $TIME_{COUNT}$ of one of the clutches 21, 22 that is controlled to the half-clutch state reaches the predetermined threshold time $TIME_{MAX}$. Thus, when the vehicle stops during the creep control in which a large load is applied on clutch friction surfaces of the clutch plates 25, 28, the clutches 21, 22 are alternately switched according to the duration time of the half-clutch state, so that the deterioration in function loss and durability of the clutches 21, 22 can be effectively prevented.

Third Embodiment

Figure 4:
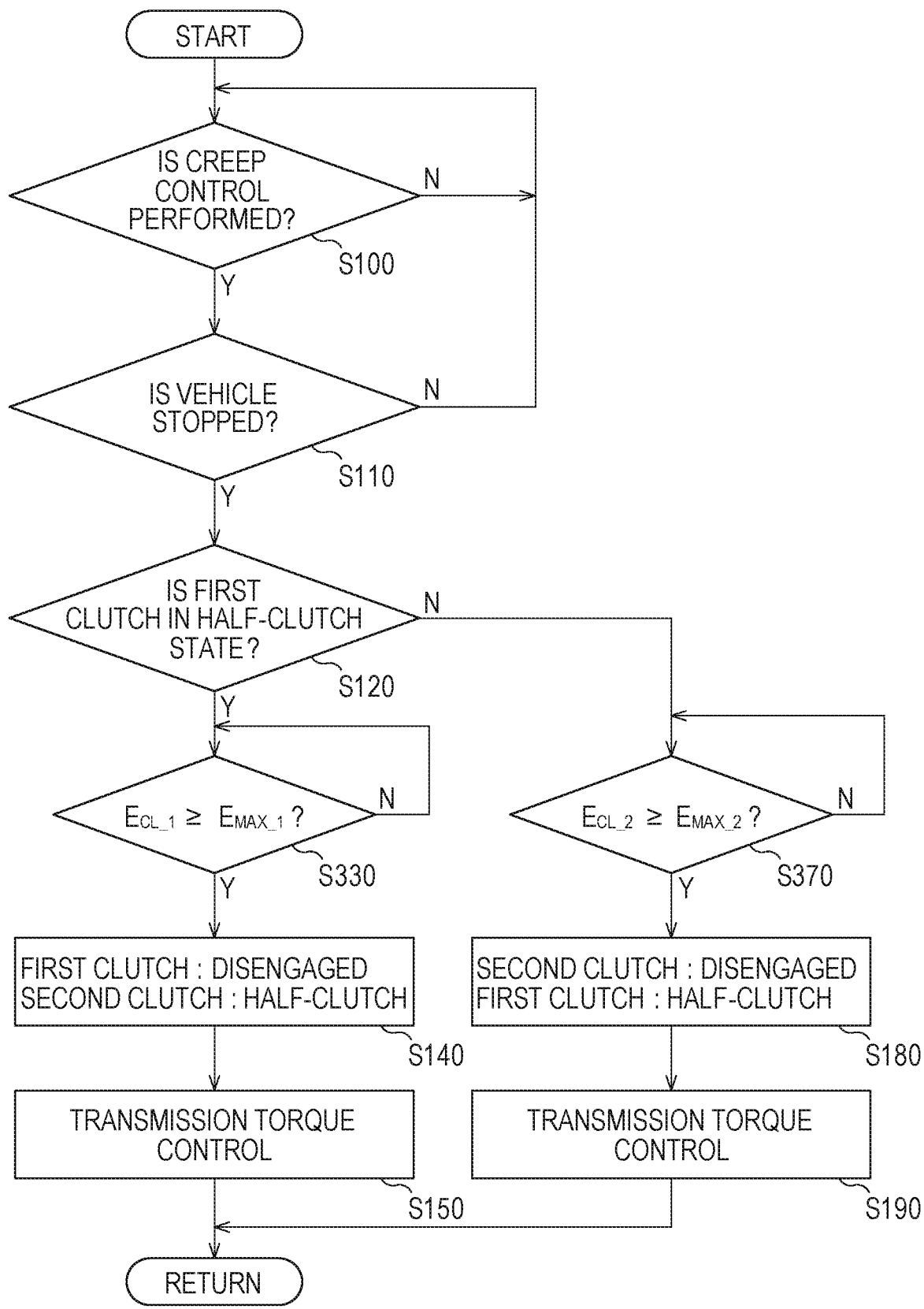
FIG. 4 is a flowchart illustrating a clutch switching control according to a third embodiment of the present disclosure.

Hereinafter, a control device and control method for a dual clutch transmission according to a third embodiment will be described based on FIG. 4. The third embodiment is configured such that the clutch switching control unit 82 performs a clutch switching control based on an absorbed energy amount $E_{CL}$ of the clutches 21, 22. The same steps as the processes of the first embodiment are denoted by the same reference numerals, and detailed description thereof will be omitted.

In step S330, it is determined whether an absorbed energy amount $E_{CL1}$ of the first clutch 21 reaches a predetermined first threshold $E_{MAX\_1}$ that may cause function loss of the first clutch 21. The absorbed energy amount $E_{CL1}$ is obtained from a function including the half clutch duration time $TIME_{COUNT\_1}$ of the first clutch 21 counted from the stop of the vehicle by a timer (not shown) and the temperature $T_{CL\_1}$ of the first clutch 21 detected by the first temperature sensor 90 as input values. If YES, the process proceeds to step S140 to prevent the function loss of the first clutch 21, and a clutch switching control switching the first clutch 21 to the disengaged state and switching the second clutch 22 to the half-clutch state is performed.

In step S120, if NO, that is, if the second clutch 22 is in the half-clutch state, the process proceeds to step S370, and it is determined whether an absorbed energy amount $E_{CL2}$ of the second clutch 22 reaches a predetermined second threshold $E_{MAX\_2}$ that may cause function loss of the second clutch 22. The absorbed energy amount $E_{CL2}$ is obtained from a function including the half clutch duration time $TIME_{COUNT\_2}$ of the second clutch 22 counted from the stop of the vehicle by the timer (not shown) and the temperature $T_{CL\_2}$ of the second clutch 22 detected by the second temperature sensor 91 as input values. If YES, the process proceeds to step S180 to prevent the function loss of the second clutch 22, and a clutch switching control switching the second clutch 22 to the disengaged state and switching the first clutch 21 to the half-clutch state is performed.

As described above in detail, according to the third embodiment, in a case where the vehicle stops during the creep control, the clutch switching control is performed such that one of the clutches 21, 22 that is in the half-clutch state is controlled to the disengaged state and the other of the clutches 21, 22 is controlled to the half-clutch state when the absorbed energy amount $E_{CL}$ of one of the clutches 21, 22 that is controlled to the half-clutch state reaches the predetermined threshold. Thus, when the vehicle stops during the creep control in which a large load is applied on clutch friction surfaces of the clutch plates 25, 28, the clutches 21, 22 are alternately switched to the half-clutch state according to the absorbed energy amount $E_{CL}$, so that the deterioration in function loss and durability of the clutches 21, 22 can be effectively prevented.

Further, the present disclosure is not limited to the above described embodiments and can be appropriately modified and implemented without departing from the spirit of the present disclosure.

The present application is based on Japanese Patent Application (JP-A-2016-038791) filed on Mar. 1, 2016, contents of which are incorporated herein as reference.

INDUSTRIAL APPLICABILITY

The present invention has an effect of effectively suppressing the deterioration in function loss and durability of the clutch, and is useful for the control device and control method for a dual clutch transmission.

DESCRIPTION OF REFERENCE NUMERALS 10 engine
20 dual clutch device
21 first clutch
22 second clutch
30 transmission mechanism
40 auxiliary transmission part
50 main transmission part
80 control unit
81 creep control unit (first control means)
82 clutch switching control unit (second control means)
83 transmission torque control unit (third control means)
90 first temperature sensor (first temperature detection means)
91 second temperature sensor (second temperature detection means)
92 first hydraulic pressure sensor
93 second hydraulic pressure sensor
94 engine rotation speed sensor
95 vehicle speed sensor
96 brake pedal sensor
97 accelerator opening sensor
98 shift position sensor

The invention claimed is:

1. A control device for a dual clutch transmission that is provided with a clutch device including a first clutch and a second clutch between a drive source and a transmission mechanism and is configured to switch a torque transmission path from the transmission mechanism to a vehicle drive system into two lines, the control device comprising a controller configured to:
    perform a creep control comprising bringing one of the first clutch and the second clutch into a half-clutch state and bringing the other of the first clutch and the second clutch into a disengaged state, so as to transmit a predetermined torque from the drive source to the transmission mechanism via the clutch device; and
    when a vehicle stops during the performing of the creep control, perform a clutch switching control comprising, on the basis of a heat-generating state of the one clutch that is maintained in the half-clutch state from the stop of the vehicle, switching the one clutch from the half-clutch state to the disengaged state and switching the other clutch from the disengaged state to the half-clutch state.

2. The control device for a dual clutch transmission according to claim 1,
    wherein the controller is further configured to:
        detect a temperature of the first clutch; and
        detect a temperature of the second clutch, and
    wherein when the vehicle stops during the performing of the creep control, the controller performs the clutch switching control when a temperature of the one clutch that is maintained in the half-clutch state reaches a predetermined threshold, the temperature of the one clutch being detected by the controller from the stop of the vehicle.

3. The control device for a dual clutch transmission according to claim 1,
    wherein when the vehicle stops during the performing of the creep control, the controller performs the clutch switching control when a half-clutch duration time of the one clutch that is maintained in the half-clutch state reaches a predetermined threshold from the stop of the vehicle.

4. The control device for a dual clutch transmission according to claim 1,
    wherein when the vehicle stops during the performing of the creep control, the controller performs the clutch switching control when absorbed energy of the one clutch that is maintained in the half-clutch state reaches a predetermined threshold from the stop of the vehicle.

5. The control device for a dual clutch transmission according to claim 1, wherein the controller is further configured to:

perform a transmission torque control in which a half-clutch engagement rate of the other clutch that is switched to the half-clutch state by the clutch switching control is adjusted so as to set the transmission torque from the drive source to the vehicle drive system to be constant before and after the clutch switching control.

6. A control method for a dual clutch transmission that is provided with a clutch device including a first clutch and a second clutch between a drive source and a transmission mechanism and is configured to switch a torque transmission path from the transmission mechanism to a vehicle drive system into two lines, the control method comprising:

performing a clutch switching control comprising, when a vehicle stops during performing of a creep control comprising bringing one of the first clutch and the second clutch into a half-clutch state and bringing the other of the first clutch and the second clutch into a disengaged state so as to transmit a predetermined torque from the drive source to the transmission mechanism via the clutch device, on the basis of a heat-generating state of the one clutch that is maintained in the half-clutch state from the stop of the vehicle, switching the one clutch from the half-clutch state to the disengaged state and switching the other clutch from the disengaged state to the half-clutch state.

7. The control method for a dual clutch transmission according to claim 6, wherein when the vehicle stops during the performing of the creep control, the clutch switching control is performed when a temperature of the one clutch that is maintained in the half-clutch state reaches a predetermined threshold from the stop of the vehicle.

8. The control method for a dual clutch transmission according to claim 6, wherein when the vehicle stops during the performing of the creep control, the clutch switching control is performed when a half-clutch duration time of the one clutch that is maintained in the half-clutch state reaches a predetermined threshold from the stop of the vehicle.

9. The control method for a dual clutch transmission according to claim 6, wherein when the vehicle stops during the performing of the creep control, the clutch switching control is performed when absorbed energy of the one clutch that is maintained in the half-clutch state reaches a predetermined threshold from the stop of the vehicle.

10. The control method for a dual clutch transmission according to claim 6, further comprising:

performing a transmission torque control in which a half-clutch engagement rate of the other clutch that is switched to the half-clutch state by the clutch switching control is adjusted so as to set the transmission torque from the drive source to the vehicle drive system to be constant before and after the clutch switching control.

11. A control device for a dual clutch transmission that is provided with a clutch device including a first clutch and a second clutch between a drive source and a transmission mechanism and is configured to switch a torque transmission path from the transmission mechanism to a vehicle drive system into two lines, the control device comprising:

a first control means configured to perform a creep control comprising bringing one of the first clutch and the second clutch into a half-clutch state and bringing the other of the first clutch and the second clutch into a disengaged state, so as to transmit a predetermined torque from the drive source to the transmission mechanism via the clutch device; and a second control means configured to, when a vehicle stops during the performing of the creep control, perform a clutch switching control comprising, on the basis of a heat-generating state of the one clutch that is maintained in the half-clutch state from the stop of the vehicle, switching the one clutch from the half-clutch state to the disengaged state and switching the other clutch from the disengaged state to the half-clutch state.

* * * * *